(12) United States Patent
Yang et al.

(10) Patent No.: US 8,565,783 B2
(45) Date of Patent: Oct. 22, 2013

(54) PATH PROGRESSION MATCHING FOR INDOOR POSITIONING SYSTEMS

(75) Inventors: Zongxiang Yang, Superior, CO (US);
Henry Frick, Boulder, CO (US); John Charles Curlander, Boulder, CO (US);
William B. Gail, Boulder, CO (US);
Sharad Agarwal, Seattle, WA (US);
Janani C. Sriram, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 88 days.

(21) Appl. No.: 12/954,545

(22) Filed: Nov. 24, 2010

(65) Prior Publication Data

US 2012/0129546 A1 May 24, 2012

(51) Int. Cl.
*H04W 24/00* (2009.01)
(52) U.S. Cl.
USPC ..................................................... 455/456.1
(58) Field of Classification Search
USPC .......... 455/67.11, 456.1–456.6; 370/328, 338
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,564,079 A * | 10/1996 | Olsson | 455/456.3 |
| 5,603,054 A | 2/1997 | Theimer et al. | |
| 5,611,050 A | 3/1997 | Theimer et al. | |
| 5,812,865 A | 9/1998 | Theimer et al. | |
| 5,842,130 A * | 11/1998 | Oprescu-Surcobe et al. | 455/456.2 |
| 5,943,621 A * | 8/1999 | Ho et al. | 455/456.3 |
| 5,948,040 A | 9/1999 | DeLorme et al. | |
| 5,978,732 A | 11/1999 | Kakitani et al. | |
| 6,052,598 A * | 4/2000 | Rudrapatna et al. | 455/456.1 |
| 6,122,572 A | 9/2000 | Yavnai | |

(Continued)

FOREIGN PATENT DOCUMENTS

| | | |
|---|---|---|
| DE | 10042983 A1 | 3/2002 |
| JP | 2007-083678 | 3/1995 |

(Continued)

OTHER PUBLICATIONS

Koyuncu, et al., "A Survey of Indoor Positioning and Object Locating Systems", Retrieved at << http://paper.ijcsns.org/07_book/201005/20100518.pdf >>, IJCSNS International Journal of Computer Science and Network Security, vol. 10, No. 5, May 2010, pp. 121-128.

(Continued)

*Primary Examiner* — Olumide T Ajibade Akonai

(57) ABSTRACT

A path progression matching system and method that uses path progression to find a current position of a mobile device in an indoor environment and a path history to find the path of the mobile device to get to the current position. Embodiments of the system and method use path history information, constraints, and optimization measures such as the use of received signal strength indicator (RSSI) weighted correlation coefficients. Embodiments of the system and method include a unified probabilistic model that uses path history and allows multiple constraints to be applied simultaneously. Embodiments of the system and method also include a path progression module having a first-stage progression module, which finds a starting location for the path progression matching, a second-stage module, which begins building a path history, and a third-stage progression module, which uses the path history to find the current position and path.

20 Claims, 10 Drawing Sheets

(56) References Cited

U.S. PATENT DOCUMENTS

| | | | |
|---|---|---|---|
| 6,353,398 B1 | 3/2002 | Amin et al. | |
| 6,466,232 B1 | 10/2002 | Newell et al. | |
| 6,480,783 B1 | 11/2002 | Myr | |
| 6,513,046 B1 | 1/2003 | Abbott, III et al. | |
| 6,549,915 B2 | 4/2003 | Abbott, III et al. | |
| 6,574,351 B1 | 6/2003 | Miyano | |
| 6,615,130 B2 | 9/2003 | Myr | |
| 6,672,506 B2 | 1/2004 | Swartz et al. | |
| 6,678,525 B1* | 1/2004 | Baranger et al. | 455/446 |
| 6,721,572 B1 | 4/2004 | Smith et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 6,992,625 B1* | 1/2006 | Krumm et al. | 342/451 |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,084,762 B2 | 8/2006 | Pedrazzini et al. | |
| 7,116,987 B2* | 10/2006 | Spain et al. | 455/456.1 |
| 7,116,988 B2 | 10/2006 | Dietrich et al. | |
| 7,127,213 B2 | 10/2006 | Haymes et al. | |
| 7,162,367 B2 | 1/2007 | Lin et al. | |
| 7,171,378 B2 | 1/2007 | Petrovich et al. | |
| 7,195,157 B2 | 3/2007 | Swartz et al. | |
| 7,215,969 B2 | 5/2007 | Benco et al. | |
| 7,233,861 B2 | 6/2007 | Van Buer et al. | |
| 7,250,907 B2* | 7/2007 | Krumm et al. | 342/451 |
| 7,385,501 B2 | 6/2008 | Miller et al. | |
| 7,433,696 B2 | 10/2008 | Dietrich et al. | |
| 7,512,462 B2 | 3/2009 | Nichols et al. | |
| 7,590,589 B2 | 9/2009 | Hoffberg | |
| 7,617,042 B2 | 11/2009 | Horvitz et al. | |
| 7,630,986 B1 | 12/2009 | Herz et al. | |
| 7,705,728 B2 | 4/2010 | Mock et al. | |
| 7,796,966 B2* | 9/2010 | Bhattacharya et al. | 455/231 |
| 7,813,870 B2 | 10/2010 | Downs et al. | |
| 7,856,234 B2 | 12/2010 | Alizadeh-Shabdiz et al. | |
| 7,864,048 B1 | 1/2011 | Cope et al. | |
| 7,873,368 B2* | 1/2011 | Goren | 455/456.1 |
| 7,899,611 B2 | 3/2011 | Downs et al. | |
| 7,912,628 B2 | 3/2011 | Chapman et al. | |
| 8,024,112 B2 | 9/2011 | Krumm et al. | |
| 8,174,447 B2* | 5/2012 | Loidl et al. | 342/451 |
| 8,180,366 B2* | 5/2012 | Ernst et al. | 455/456.1 |
| 2001/0029425 A1 | 10/2001 | Myr | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2004/0068364 A1 | 4/2004 | Zhao et al. | |
| 2004/0201500 A1 | 10/2004 | Miller et al. | |
| 2005/0034078 A1 | 2/2005 | Abbott et al. | |
| 2005/0228553 A1 | 10/2005 | Tryon | |
| 2005/0261004 A1 | 11/2005 | Dietrich et al. | |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0241862 A1 | 10/2006 | Ichihara et al. | |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2008/0191941 A1 | 8/2008 | Saban et al. | |
| 2009/0043504 A1 | 2/2009 | Bandyopadhyay et al. | |
| 2009/0191892 A1 | 7/2009 | Kelley | |
| 2010/0039929 A1* | 2/2010 | Cho et al. | 370/216 |
| 2010/0079334 A1 | 4/2010 | Roh et al. | |
| 2010/0097269 A1 | 4/2010 | Loidl et al. | |
| 2010/0156708 A1 | 6/2010 | Chen | |
| 2010/0161179 A1 | 6/2010 | Mcclure et al. | |
| 2010/0250133 A1 | 9/2010 | Buros | |
| 2010/0255858 A1 | 10/2010 | Juhasz | |
| 2010/0324813 A1 | 12/2010 | Sundararajan et al. | |
| 2011/0050493 A1 | 3/2011 | Torimoto et al. | |
| 2011/0071759 A1 | 3/2011 | Pande et al. | |
| 2011/0151898 A1 | 6/2011 | Chandra et al. | |
| 2011/0163914 A1 | 7/2011 | Seymour | |
| 2011/0191052 A1 | 8/2011 | Lin et al. | |
| 2013/0018581 A1 | 1/2013 | Sidhu et al. | |
| 2013/0018629 A1 | 1/2013 | Sidhu et al. | |

FOREIGN PATENT DOCUMENTS

| | | |
|---|---|---|
| JP | 2008-271277 | 10/1996 |
| JP | 10132593 A | 5/1998 |
| JP | 2011-153446 | 8/1999 |
| JP | 2002-328035 | 11/2002 |
| JP | 2004-317160 | 11/2004 |
| KR | 19970071404 | 11/1997 |
| KR | 20040033141 A | 4/2004 |
| KR | 20040050550 A | 6/2004 |
| RU | 8141 | 10/1998 |
| WO | WO 9800787 | 1/1998 |

OTHER PUBLICATIONS

Cabero, et al., "Indoor People Tracking Based on Dynamic Weighted Multi Dimensional Scaling", Retrieved at << http://www.ri.cmu.edu/pub_files/pub4/maria_cabero_jose_2007_1/maria_cabero_jose_2007_1.pdf >>, 10th International Symposium on Modeling, Analysis and Simulation of Wireless and Mobile Systems, Oct. 22-26, 2007, pp. 8.

Zhu, et al., "Indoor/Outdoor Location of Cellular Handsets Based on Received Signal Strength", Retrieved at << http://ieeexplore.ieee.org/stamp/stamp.jsp?amumber=01543256 >>, Electronics Letters, vol. 41, No. 1, Jan. 6, 2005, pp. 2.

De Moraes, et al., "Calibration-Free WLAN Location System Based on Dynamic Mapping of Signal Strength", Retrieved at << http://www.ravel.ufrj.br/arquivosPublicacoes/WAC11-demoraes.pdfs >>, 9th International Symposium on Modeling, Analysis and Simulation of Wireless and Mobile Systems, Oct. 2-6, 2006, pp. 8.

Rogoleva, Luba., "Crowdsourcing Location Information to Improve Indoor Localization", Retrieved at << http://e-collection.ethbib.ethz.ch/eserv/eth:1224/eth-1224-01.pdf >>, Master Thesis, Apr. 30, 2010, pp. 91.

Paul, et al., "Wi-Fi Based Indoor Localization and Tracking Using Sigma-Point Kalman Filtering Methods", Retrieved at << http://www.cse.ogi.edu/~anindya/Paul_Wan_Plans08.pdf >>, IEEE/ION Position, Location and Navigation Symposium, May 5-8, 2008, pp. 14.

Beard, K., et al., "Estimating positions and paths of moving objects", Temporal Representation and Reasoning, 2000. TIME 2000. Proceedings. Seventh International Workshop on; Digital Object Identifier: 10.1109/TIME.2000.856597 Publication Year: 2000, pp. 155-162.

Billinghurst, Mark, et al., "An Evaluation of Wearable Information Spaces", Proceedings of the Virtual Reality Annual International Symposium, 1998, 8 pages.

(56) References Cited

OTHER PUBLICATIONS

Billinghurst, Mark, et al., "Research Directions in Wearable Computing", University of Washington, May, 1998, 48 pages.
Billinghurst, Mark, et al., "Wearable Devices: New Ways to Manage Information", IEEE Computer Society, Jan. 1999, pp. 57-64.
Chen, Guanling, et al., "A Survey of Context-Aware Mobile Computing Research," Dartmouth Computer Science Technical Report, 2000, 16 pages.
Choi, Jae-Hyeong, et al., "Performance evaluation of traffic control based on geographical information", Intelligent Computing and Intelligent Systems, 2009. ICIS 2009. IEEE International Conference on; vol. 3; Publication Year: 2009, pp. 85-89.
Chun, Byung-Gon et al., "Clone Cloud: Elastic Execution between Mobile Device and Cloud", In Proceedings of EuroSys 2011, available at <http://eurosys2011.cs.uni-salzburg.at/pdf/eurosys2011-chun.pdf> (Apr. 2011), 14 pages.
Collin, Jussi et al., "Indoor Positioning System using Accelerometry and High Accuracy Heading Sensors", In Proceedings of GPS/GNSS 2003, Available at <http://plan.geomatics.ucalgary.ca/papers/gps03jussic.pdf>, (Sep. 2003), pp. 1-7.
Goyal, Vishal, "MEMS based motion sensing design," retrieved at <<http://eeherald.com/section/design-guide/mems_application.html>>, EE Herald, retrieved Jul. 9, 2012, 2 pages.
Gusenbauer, et al., "Self-Contained Indoor Positioning on Off-The-Shelf Mobile Devices", retrieved at >>http://ieeexplore.ieee.org/stamp/stamp.jsp?tp=&arnumber=05646681>>, International Conference on Indoor Positioning and Indoor Navigation (IPIN), Sep. 2010, 9 pages.
Harter, Andy, et al., "A Distributed Location System for the Active Office," IEEE Network, 1994, pp. 62-70.
Horvitz, Eric, et al., "Attention-Sensitive Alerting in Computing Systems", Microsoft Research, Aug. 1999.
Horvitz, Eric, et al., "In Pursuit of Effective Handsfree Decision Support: Coupling Bayesian Inference", Speech Understanding, and User Models,1995, 8 pages.
Jimenez, A.R., et al., "A Comparison of Pedestrian Dead-Reckoning Algorithms using a Low-Cost MEMS IMU", WISP 2009, $6^{th}$ IEEE International Symposium on Intelligent Signal Processing, Aug. 26-28, 2009, Budapest, Hungary, pp. 37-42.
Jin, Yunye et al., "A Robust Dead-Reckoning Pedestrian Tracking System with Low Cost Sensors", 2011 IEEE International Conference on Pervasive Computing and Communications (PerCom), Seattle, WA, Mar. 21-25, 2011, (Mar. 21, 2011), pp. 222-230.
Joachims, T., "Text categorization with support vector machines: learning with many relevant features", Machine Learning, European Conference on Machine Learning, Apr. 21, 1998, pp. 137-142.
Kostov, V., et al., "Travel destination prediction using frequent crossing pattern from driving history", Intelligent transportation Systems, 2005. Proceedings. 2005 IEEE; Digital Object Identifier: 10.1109/ITSC.2005.1520182 Publication Year: 2005, pp. 343-350.
Krumm, "Predestination: Where Do You Want to Go Today?"; Computer; vol. 40, Issue 4; Apr. 2007; pp. 105-107.
Lachapelle, Gerard, "GNSS Indoor Location Technologies", Journal of Global Positioning Systems (2004) vol. 3, No. 1-2, (Nov. 15, 2004), pp. 2-11.
Lee, Junghoon, et al., "Design and implementation of a movement history analysis frame-work for the Taxi telematics system", Communications, 2008. APCC 2008. $14^{th}$ Asia-Pacific Conference on; Publication Year: 2008, pp. 1-4.
Liu, Feng, et al., "Remaining Delivery Time Estimation Based Routing for Intermittently Connected Mobile Networks", Distributed Computing Systems Workshops, 2008. ICDCS '08. 28th International Conference, Publication Year: 2008, pp. 222-227.
Losee, Robert M. Jr., "Minimizing information overload: the ranking of electronic messages", Journal of Information Science 15, Elsevier Science Publishers B.V., 1989, pp. 179-189.
Miyashita, K. et al., "A Map Matching Algorithm for Car Navigation Systems that Predict User Destination", Advanced Information Networking and Applications—Workshops, 2008. AINAW 2008. $22^{nd}$ International Conference, Publication Year: 2008, pp. 1551-1556.

Rhodes, Bradley J., "Remembrance Agent: A continuously running automated information retrieval system", the Proceedings of the First International Conference on the Practical Application of Intelligent Agents and Multi Agent Technology,1996, pp. 487-495.
Rhodes, Bradley J., "The Wearable Remembrance Agent: A System for Augmented Memory", Personal Technologies Journal Special Issue on Wearable Computing, 1997, 12 pages.
Rhodes, Bradley J., "The Wearable Remembrance Agent: A System for Augmented Theory", The Proceedings of the First International Symposium on Wearable Computers, Oct. 1997, pp. 123-128.
Sananmongkhonchai, S. et al., "Cell-based traffic estimation from multiple GPS-equipped cars", 2009 IEEE Region 10 Conference Publication Year: 2009, pp. 1-6.
Schilit, Bill, et al., "Context-Aware Computing Applications", In Proceedings of the Workshop on Mobile Computing Systems and Applications, Dec. 1994, pp. 85-90.
Schilit, Bill, et al., "Customizing Mobile Applications", Proceedings USENIX Symposium on Mobile and Location Independent Computing, Aug. 1993, 9 pages.
Schilit, Bill, et al., "Disseminating Active Map Information to Mobile Hosts", IEEE Network, 1994 pp. 22-32, vol. 8—No. 5.
Schilit, Bill, et al., "The ParcTab Mobile Computing System", IEEE WWOS-IV, 1993, 4 pages.
Schilit, William Noah, "A System Architecture for Context-Aware Mobile Computing", Columbia University, 1995, 153 pages.
Shin, Seung H., et al., "Sit-Down & Stand-Up Awareness Algorithm for the Pedestrian Dead Reckoning", GNSS '09, May 3-6, 2009, available at <http://s-space.snu.ac.kr/bitstream/10371/27736/1/Sit-Down%20&%20Stand-Up%20Awareness%20Algorithm%20for%20the%20 Pedestrian%20Dead%20Reconing.pdf>, (May 3, 2009), 6 pages.
Sidhu, et al., "Multi-Stage Dead Reckoning for Crowd Sourcing," U.S. Appl. No. 13/284,128, filed on Oct. 28, 2011, 42 pages.
Sidhu, et al., "Power-Efficient Activation of a Device Movement Sensor Module"; U.S. Appl. No. 13/325,065 filed on Dec. 14, 2011; 65 pages.
Simmons, R, et al, "Learning to Predict Driver Route and Destination Intent", Intelligent Transportation Systems Conference, 2006. IEEE; Digital Object Identifier: 10.1109/ITSC.2006.1706730 Publication Year: 2006, pp. 127-132.
Spreitzer, Mike, et al., "Providing Location Information in a Ubiquitous Computing Environment", SIGOPS '93, 1993, pp. 270-283.
Spreitzer, Mike, et al., "Architectural Considerations for Scalable, Secure, Mobile Computing with Location Information", In The 14th International Conference on Distributed Computing Systems, Jun. 1994, pp. 29-38.
Spreitzer, Mike, et al., "Scalable, Secure, Mobile Computing with Location Information", Communications of the ACM, vol. 36—No. 7, Jul. 1993, 1 page.
Starner, Thad Eugene, "Wearable Computing and Contextual Awareness", Massachusetts Institue of Technology, Jun. 1999, 248 pages. (in two PDFs).
Terada, T, et al., "Design of a Car Navigation System that Predicts User Destination", Mobile Data Management, 2006. MDM 2006. $7^{th}$ International Conference on; Publication Year: 2006, pp. 145-150.
Theimer, Marvin, et al., "Operating System Issues for PDA's", in Fourth Workshop on Workstation Operating Systems, 1993, 7 pages.
Toledo-Moreo, Rafael et al., "Lane-Level Integrity Provision for Navigation and Map Matching With GNSS, Dead Reckoning, and Enhanced Maps", IEEE Transactions on Intelligent Transportation Systems, vol. 11, No. 1, (Mar. 2010), pp. 100-112.
Toledo-Moreo, Rafael et al., "Performance Aspects of Navigation Systems for GNSS-Based Road User Charging", In Proceedings of ION GNSS 2010, (Sep. 2010), 9 pages.
Vaughan-Nichols, S.J., "Will Mobile Computing's Future Be Location, Location, Location?", Computer; vol. 42, Issue: 2 Digital Object Identifier: 10.1109/MC.2009.65; Publication Year: 2009, pp. 14-17.
Want, Roy, "Active Badges and Personal Interactive Computing Objects", IEEE Transactions on Consumer Electronics, vol. 38—No. 1, 1992, 11 pages.
Want, Roy, et al., "The Active Badge Location System", Acm Transactions on Information Systems, vol. 10—No. 1, Jan. 1992, pp. 91-102.

(56) References Cited

OTHER PUBLICATIONS

Wei, Chien-Hung, et al., "Development of Freeway Travel Time Forecasting Models by Integrating Different Sources of Traffic Data", IEEE Transactions on Vehicular Technology; vol. 56, Issue: 6, Part: 2; Nov. 2007, pp. 3682-3694.

Weiser, Mark, "Some Computer Science Issues in Ubiquitous Computing", Communications of the ACM, vol. 36—No. 7, Jul. 1993, pp. 75-84.

Weiser, Mark, "The Computer for the 21$^{st}$ Century", Scientific American, Sep. 1991, 8 pages.

Wendlandt, Kai et al., "Continuous Location and Direction Estimation with Multiple Sensors Using Particle Filtering", International Conference on Multisensor Fusion and Integration for Intelligent Systems, 2006, IEEE, (Sep. 2006), 6 pages.

Workshop on Wearable Computing Systems, Aug. 19-21, 1996.

Wu, Yan-Jing, et al., "A dynamic navigation scheme for vehicular ad hoc networks", Networked Computing and Advanced Information Management (NCM), 2010 Sixth International Conference on; Publication Year: 2010, pp. 231-235.

Xie, M. et al., "Development of Navigation System for Autonomous Vehicle to Meet the DARPA Urban Grand Challenge", Intelligent Transportation Systems Conference, 2007. Itsc 2007. IEEE; Sep. 30-Oct. 3, 2007, Seattle, WA; pp. 767-772.

Xuan, Yiguang et al., "Crowd Sourcing Indoor Maps with Mobile Sensors", MUS '10, Dec. 6-9, 2010, available at <http://www.ocf.berkeley.edu/~xuanyg/IndoorMap_Mobiquitous2010_ver2.pdf>, (Dec. 6, 2010), 12 pages.

Ye, Qian, et al, "Predict Personal Continuous Route", 2008. 11$^{th}$ International IEEE Conference on Intelligent Transportation Systems; Oct. 12-15, 2008, Beijing, China; pp. 587-592.

PCT Application U.S. Appl. No. PCT/US2008/067808, International Search Report and Written Opinion dated Dec. 12, 2008; 8 pages.

PCT Application U.S. Appl. No. PCT/US2006/034608, International Search Report dated Jan. 15, 2007; 2 pages.

PCT Application U.S. Appl. No. PCT/US00/20685; International Search Report dated Sep. 29, 2003; 3 pages.

Russian Patent Appln. 2008112196/11; Office Action dated Jun. 8, 2010.

\* cited by examiner

| MAC Addresses of Access Points | Input Wi-Fi Signal | Strongest to Weakest Order | Incorrect Match | Strongest to Weakest Order | Ordinal Difference (third column subtract fifth column, absolute value) |
|---|---|---|---|---|---|
| 00:0B:86:D4:4C:C0 | -57 | 0 | -88 | 3 | 3 |
| 00:0B:86:D6:08:20 | -63 | 1 | -92 | 4 | 3 |
| 00:0B:86:D6:08:40 | -65 | 2 | -93 | 5 | 3 |
| 00:0B:86:D4:56:00 | -72 | 3 | -85 | 2 | 1 |
| 00:0B:86:D4:50:00 | -74 | 4 | -82 | 1 | 3 |
| 00:0B:86:D6:08:60 | -91 | 5 | -65 | 0 | 5 |

FIG. 4

PATH PROGRESSION MATCHING FOR INDOOR POSITIONING SYSTEMS

BACKGROUND

Using radio-based Wireless Fidelity (or Wi-Fi, a trademark of the Wi-Fi Alliance) sources to perform indoor positioning has attracted increased attention in the recent. These Wi-Fi sources include mobile devices, such as smartphones. However, building an accurate and stable indoor positioning system remains a challenging task.

One reason that this is a challenging task is that radio signals propagate in a complicated manner and are often affected by noise and other sources. This can result in unstable and noisy signal strength readings. Another reason that makes this takes challenging is that physical characteristics in an indoor setting (such as walls, furniture, computers, and elevators) can affect the Received Signal Strength Indication (RSSI). In addition, movement of persons within the indoor environment can also adversely affect the RSSI. Another factor adding to the challenge is that human indoor movement tends to be less predictable and endures less physical constraints as compared to vehicles on highways.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the path progression matching system and method use a path progression approach to find a current position of a mobile device in an indoor environment. Moreover, embodiments of the path progression matching system and method use a path history to find the current path that was taken by the mobile device to get to the current position. The use of a path progression matching technique increases accuracy and robustness of the results.

Embodiments of the path progression matching system and method tackle the indoor positioning problem by using the path progression matching technique that takes positioning in a dynamic and real time context. Embodiments of the system and method use path history information and indoor physical constraints effectively to achieve desired accuracy and robustness. Other optimization measures such as the use of received signal strength indicators (RSSI) weighted correlation coefficient, a Maximum Ordinal Difference technique, a walking speed constraint, and probabilities of points of interest are also employed.

Embodiments of the system and method include a unified probabilistic model. The model uses path history information and allows multiple constraints to be applied simultaneously, thereby increasing positioning accuracy and robustness. In addition, the model is dynamic, flexible, and adaptive which permits the self-learning and self-correction so that it avoids being trapped in a local maximum. The unified probabilistic model uses a variety of weights and constraints to score the probability that the mobile device is in a certain position. The unified probabilistic model 210 makes embodiments of the path progression matching system 100 and method robust in a variety of situations. It is helpful to employ as many constraints as possible in order to achieve high positioning accuracy and stability.

Embodiments of the system and method also include a maximum ordinal difference module. This is an optional module that addresses the problem that the unified probabilistic model may have of occasionally finding an incorrect match. A maximum ordinal difference score is computed for a set of signals and a threshold is used to identify and disqualify such bad matches.

Embodiments of the system and method also include a path progression module. The path progression module determines a current location of the mobile device and the path taken to get to that current location. Embodiments of the path progression module include the first-stage progression module, a second-stage progression module, and a third-stage progression module. The first-stage module is used to find a starting location for the path progression matching technique. This first-stage module uses an RSSI weight to determine a first position of the mobile device at a first time.

A second-stage module is used to begin a path matching technique. Embodiments of the second-stage module find a second position of the mobile device at a second time, which is later in time than the first time. A second-stage network distance circle is computed based on a maximum distance that a person can walk within the given time. For each point within the circle an RSSI weight correlation coefficient is computed. The points with the highest coefficient scores are selected as the ToNodes for potential paths, while top-scoring points from the first stage are selected as the FromNodes for the potential paths.

A path weight is computed for each potential path using the unified probabilistic model. The potential path having the highest path weight is selected as the first most probable path that the mobile device took to get to the current position. Moreover, the ToNode of the first most probable path is selected as the second position of the mobile device at the second time.

A third-stage (and higher stage) module is used to continue the path matching technique by making use of the path history. Similar to the second-stage module, a second most probable path is computed and the ToNode for that path is designated as the third position at the third time. Higher progressions repeat the process set forth in the third-stage module to find a current position of the mobile device and a most probable path at a certain time. Embodiments of the path progression matching technique also include a maximum path weight module that prevents the path weights from becoming too small.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 4 illustrates an example of a maximum ordinal difference calculation performed by embodiments of the maximum ordinal difference module shown in FIG. 2.

DETAILED DESCRIPTION

In the following description of embodiments of the path progression matching system and method reference is made to the accompanying drawings, which form a part thereof, and in which is shown by way of illustration a specific example whereby embodiments of the path progression matching system and method may be practiced. It is to be understood that other embodiments may be utilized and structural changes may be made without departing from the scope of the claimed subject matter.

I. System Overview

Figure 1:
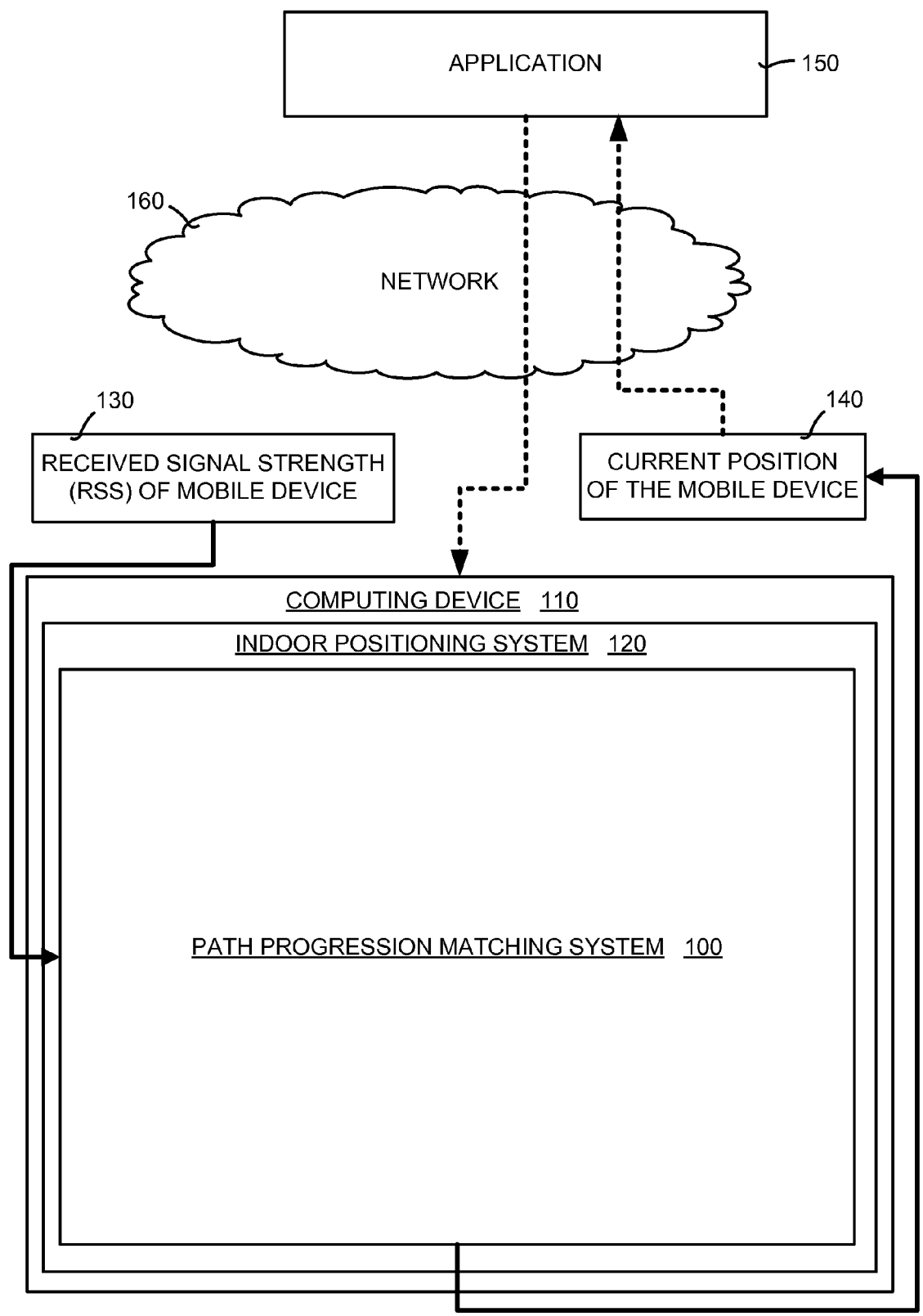
FIG. 1 is a block diagram illustrating a general overview of embodiments of a path progression matching system and method implemented on a computing device.

FIG. 1 is a block diagram illustrating a general overview of embodiments of a path progression matching system 100 and method implemented on a computing device 110. In general, embodiments of the path progression matching system 100 and method use path progression matching to obtain a current position of a mobile device in an indoor environment and the path that the device has taken.

In particular, as shown in FIG. 1, embodiments of the path progression matching system 100 and method are implemented into an indoor positioning system 120. Embodiments of the path progression matching system 100 and method obtain received signal strength (RSS) data from the mobile device (box 130). This RSS data is used by embodiments of the path progression matching system 100 and method to find the current position and path of the mobile device.

The RSS data is processed by embodiments of the path progression matching system 100 and method to obtain the current position of the mobile device (box 140). The current position can be communicated to an application 150 that communicates with the computing device 110 over a computer network 160. In some embodiments the application 150 will request the current position over the computer network 160. In other embodiments, the application 150 will reside on the computing device 110. The dashed lines in FIG. 1 merely illustrate the fact that the information is flowing between the application 150 and the computing device 110 in both directions.

Figure 2:
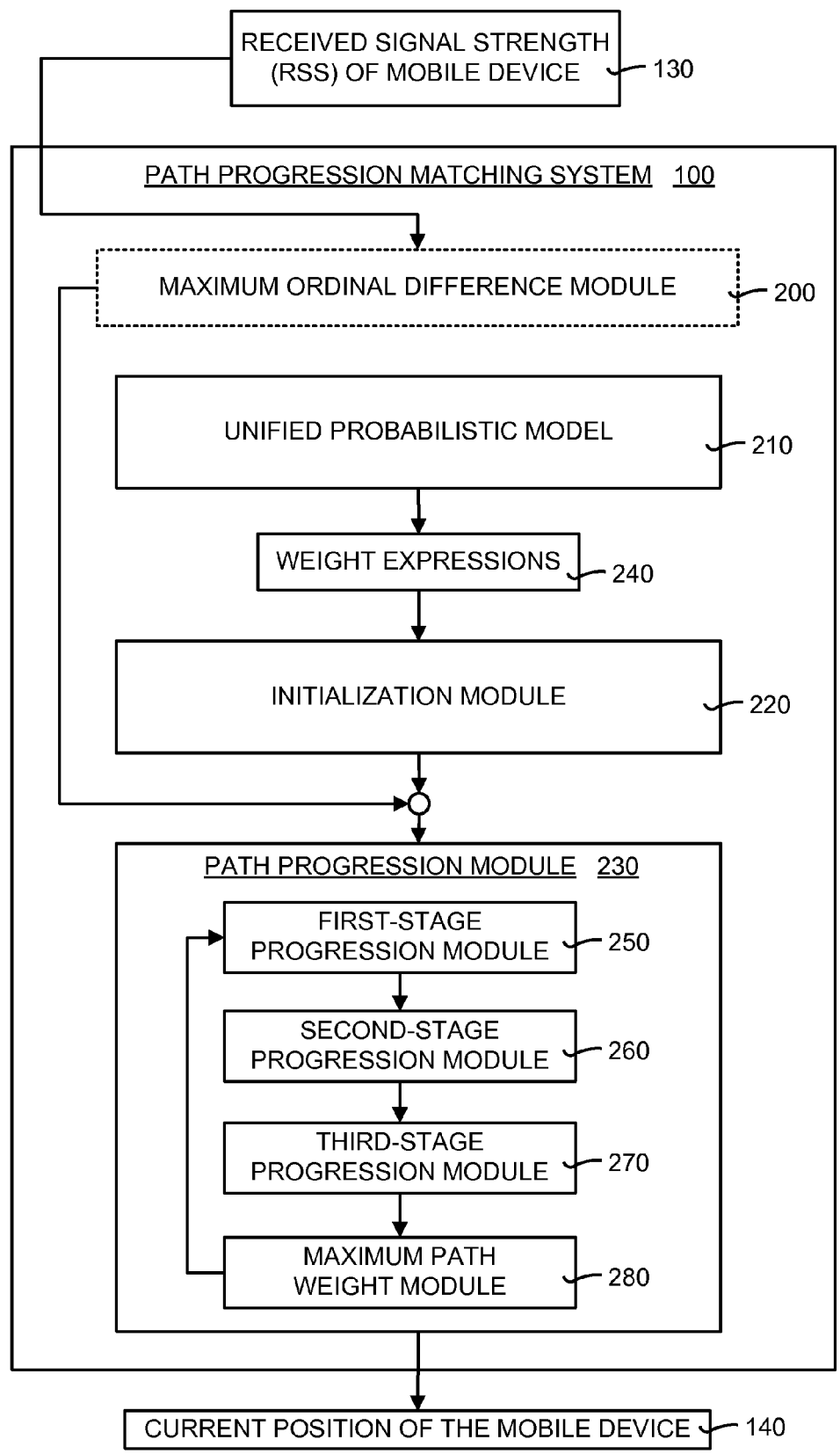
FIG. 2 is a block diagram illustrating details of embodiments of the path progression matching system and method shown in FIG. 1.

FIG. 2 is a block diagram illustrating details of embodiments of the path progression matching system 100 and method shown in FIG. 1. Embodiments of the path progression matching system 100 include an optional maximum ordinal difference module 200, a unified probabilistic model 210, an initialization module 220, and a path progression module 230. As shown in FIG. 2, the RSS data of the mobile device (box 130) is received by the optional maximum ordinal difference module 200. The dashed lines of the module 200 are meant to indicate that the module 200 is optional. The RRS data of the mobile device (box 130) ultimately is input to embodiments of the path progression module 230.

The unified probabilistic model 210 includes various optimization measures and constraints that help provide accurate information about the location of the mobile device. The output of the unified probabilistic model 210 is a plurality of weight expressions 240 that are used to find the location of the mobile device as well as the path that the mobile device has previously taken. The initialization module 220 is used to initialize the variables, queues, and lists used to determine the current position and path of the mobile device.

Embodiments of the path progression module 230 include a first-stage progression module 250, a second-stage progression module 260, a third-stage progression module 270, and a maximum path weight module 280. The first-stage progression module 250 determines the current location of the mobile device from a first set of RSS data. At this point there is no path information. The second-stage progression module 260 adds a second set of RSS data and finds a most probable path. This path is added to a list for use by later stages of the progression. The third-stage progression module 270 uses data from previous paths (or path history data) to obtain an up-to-date position and determine a path taken to get to that position. This progression pattern is used for the third stage and all subsequent stages. The progression can be repeated for as long as desired in order to track and find the current location of the mobile device.

The maximum path weight module 280 alleviates the situation where the path weight becomes too small as the progression moves forward in time. A threshold and normalizing procedure is used to ensure that the path weight stays above the threshold. The output of embodiments of the path progression module 230 is the current position of the mobile device (box 140).

II. Operational Overview

Figure 3:
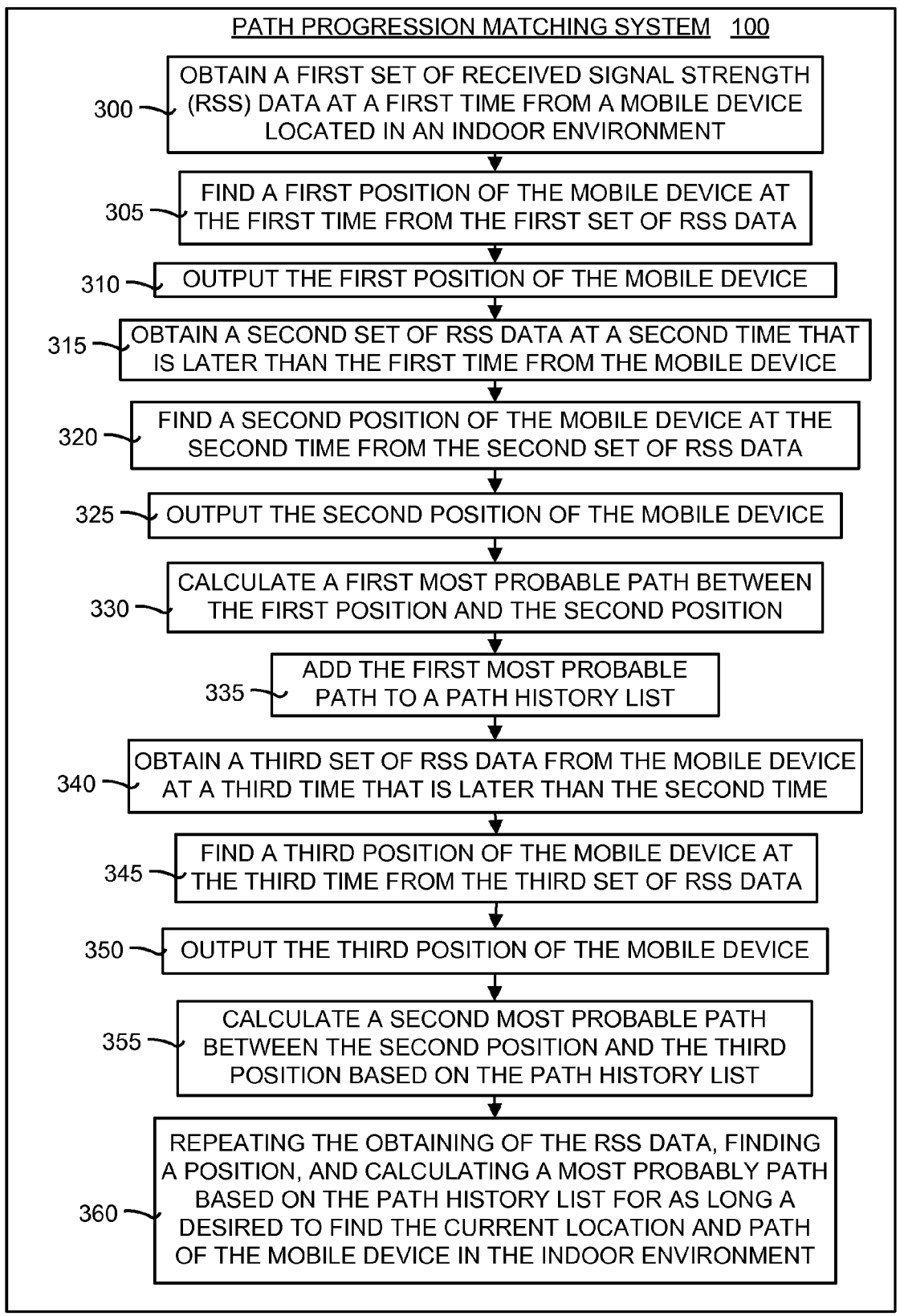
FIG. 3 is a flow diagram illustrating the general operation of embodiments of the path progression matching system shown in FIGS. 1 and 2.

FIG. 3 is a flow diagram illustrating the general operation of embodiments of the path progression matching system 100 shown in FIGS. 1 and 2. In general, embodiments of the path progression matching method use path progression matching to find a current position of a mobile device and find the path taken by the mobile device to get to that current position. More specifically, the method begins by obtaining a first set of RSS data at a first time (box 300). The data is received from a mobile device located in an indoor environment. A first position of the mobile device is found at the first time using the first set of RSS data (box 305). Next, the first position of the mobile device is output (box 310).

Embodiments of the path progression matching system 100 then obtain a second set of RSS data from the mobile device at a second time that is later than the first time (box 315). Embodiments of the system 100 then find a second position of the mobile device at the second time using the second set of RSS data (box 320). This second position of the mobile device then is output (box 325). A first most probable path of the mobile device between the first position and the second position is calculated (box 330). This first most probable path is added to a path history list (box 335).

Embodiments of the system 100 then obtain a third set of RSS data from the mobile device at a third time that is later than the second time (box 340). A third position of the mobile device at a third time is found using the third set of RSS data (box 345). The third position of the mobile device is output (box 350). A second most probable path of the mobile device between the second position and the third position is computed based on the path history list (box 355). This progression is repeated such that the obtaining of the RSS data, the finding of the position of the mobile device, and the calculation of a most probable path based on the path history list are performed for as long as is desired to find the current location and path of the mobile device in the indoor environment (box 360).

III. System and Operational Details

The system and the operational details of embodiments of the path progression matching system 100 and method now will be discussed. These embodiments include embodiments of the unified probabilistic model 210, the maximum ordinal difference module 200, the initialization module 220, and the path progression module 230. The system and operational details of each of these modules now will be discussed in detail.

III.A. Unified Probabilistic Model

Embodiments of the path progression matching system 100 and method use a unified probabilistic model 210 to score the probability that a mobile device is in a certain position. The unified probabilistic model 210 makes embodiments of the path progression matching system 100 and method robust in a variety of situations. A robust indoor position system has great value for indoor positioning and routing in a variety of scenarios such as retail stores, airports, and large conference centers. As Wi-Fi readings on moving mobile devices tend to be unstable and unpredictable, it is advantageous to employ as many constraints as possible in order to achieve high positioning accuracy and stability.

Embodiments of the path progression matching system 100 and method use the unified probabilistic model 210, which incorporates the following constraints:

(a) Network distance constraint: Given a person's walking speed limit, the maximum distance he or she can walk can be calculated. This yields the network distance constraint;

(b) Physical Constraints: Quite often there are physical constraints in an indoor environment (such as walls, aisles, and employee-only zone) that customers cannot access. This means that the position probability on these areas is zero;

(c) Matching Score: Wi-Fi signal readings are the major contributing factor for determining the position of a mobile device. The higher the matching score of the measured Wi-Fi signal pattern compared to a survey point's signal pattern, then the higher the probability of the mobile device being at or near that survey point. A survey point is a known indoor location where Wi-Fi signals are measured and the location where the RSS values are recorded and associated;

(d) Network constraint: If a customer walks along a certain aisle, say aisle A1, it would be beneficial to assume that the customer would continue to walk along aisle A1 in the upcoming seconds. The network constraint assigns a larger weight to those candidate positions that are on aisle A1;

(e) Other Constraints: Consistency checks can be performed with other sensor measurements, such as accelerometer sensor step count data and magnetic compass sensor orientation data. The approximate position points that have more support from this data are assigned larger weights.

Embodiments of the path progression matching system 100 and method determine a current position of a mobile device by finding the path having the largest weight. Embodiments of the path progression matching system 100 and method determine the weight of a path from the path's FromNode Weight and its ToNode Weight. Mathematically, the Path Weight, $W_p$, is determined by its FromNode Weight, $W_{from}$, and its ToNode Weight, $W_{to}$, as follows:

$$W_p = W_{from} \times W_{to}$$

The FromNode Weights and ToNode Weights are determined using the unified probabilistic model discusses above that can incorporate any combination of the above-mentioned constraints. Mathematically, the FromNode Weights or ToNode Weight can be written as:

$$W_{from}(\text{or } W_{to}) = W_{rss} \times W_{net} \times W_{step} \times W_{comp}$$

where, $W_{rss}$ is the weighted correlation coefficient based on Received Signal Strength (RSS);

$W_{net}$ is the pre-specified weight enlarging factor (>1) on points that are on the same route as previous points;

$W_{step}$ is the weight determined by its step count consistency check, given by:

$$W_{step} = 1 - |(d - N_{SC} * D_S)| / d,$$

where $N_{SC}$ is the step count, $D_S$ is the average walking distance for each step, and d is the distance from this point position to previous user position;

$W_{comp}$ is the weight obtained from compass data check, given by:

$$W_{comp} = 1 - |A - A_C| / 180,$$

where A is the azimuth angle of this point position relative to previous point position, and $A_C$ is the measured azimuth angle with a compass sensor.

The weights for other sensors' measurements are only applicable if the data is available, and the new weights can be introduced in a similar manner if any new sensors' measurements can bring additional insight to the mobile device's position.

III.B. Maximum Ordinal Difference Module

The use of weighted normalized correlation coefficients has the advantage that it is not affected by the Received Signal Strength (RSS) values. Instead, it depends more upon the relative RSS pattern among multiple Wi-Fi access points. This is particularly useful as different mobile devices tend to have different RSS readings.

However, it has its vulnerability too. For example, it may find the incorrect match, such as a far away point having a similar pattern. This may occur especially when a fixed number of strongest Wi-Fi signals are used for the sake of positioning reliability, because the use of stronger Wi-Fi signals is more beneficial to the positioning reliability.

In order to address this problem, embodiments of the path progression matching system 100 and method include the maximum ordinal difference module 200 that uses a measure called a "Maximum Ordinal Difference" (MOD) to spot such bad matches. An example will be used to illustrate the MOD. Assume that a mobile device at point 1 receives 5 Wi-Fi signals and the strongest signal is from the access point A. In other words, its ordinal index is 0. At point 2, assume that the signal from the access point A ranks the fourth strongest. In other words, its ordinal index is 3. Therefore, the ordinal difference for the access point A is 3 (=3−0).

The maximum ordinal difference is the maximum value among all the five access points' ordinal differences. In practice, some embodiments of the path progression matching system 100 use a MOD threshold to identify and disqualify such bad matches. For instance, if the MOD threshold is 4 such that the 4 strongest Wi-Fi signals are used for pattern matching, then any match with a MOD greater than or equal to 4 is disqualified. FIG. 4 illustrates an example of a maximum ordinal difference calculation performed by embodiments of the maximum ordinal difference module 200 shown in FIG. 2.

III.C. Initialization Module

Embodiments of the path progression matching system 100 include an initialization module 220. In general, embodiments of the initialization module 220 find the initial location of a mobile device and give embodiments of the path progression matching system 100 and method a place to begin the path progression.

Figure 5:
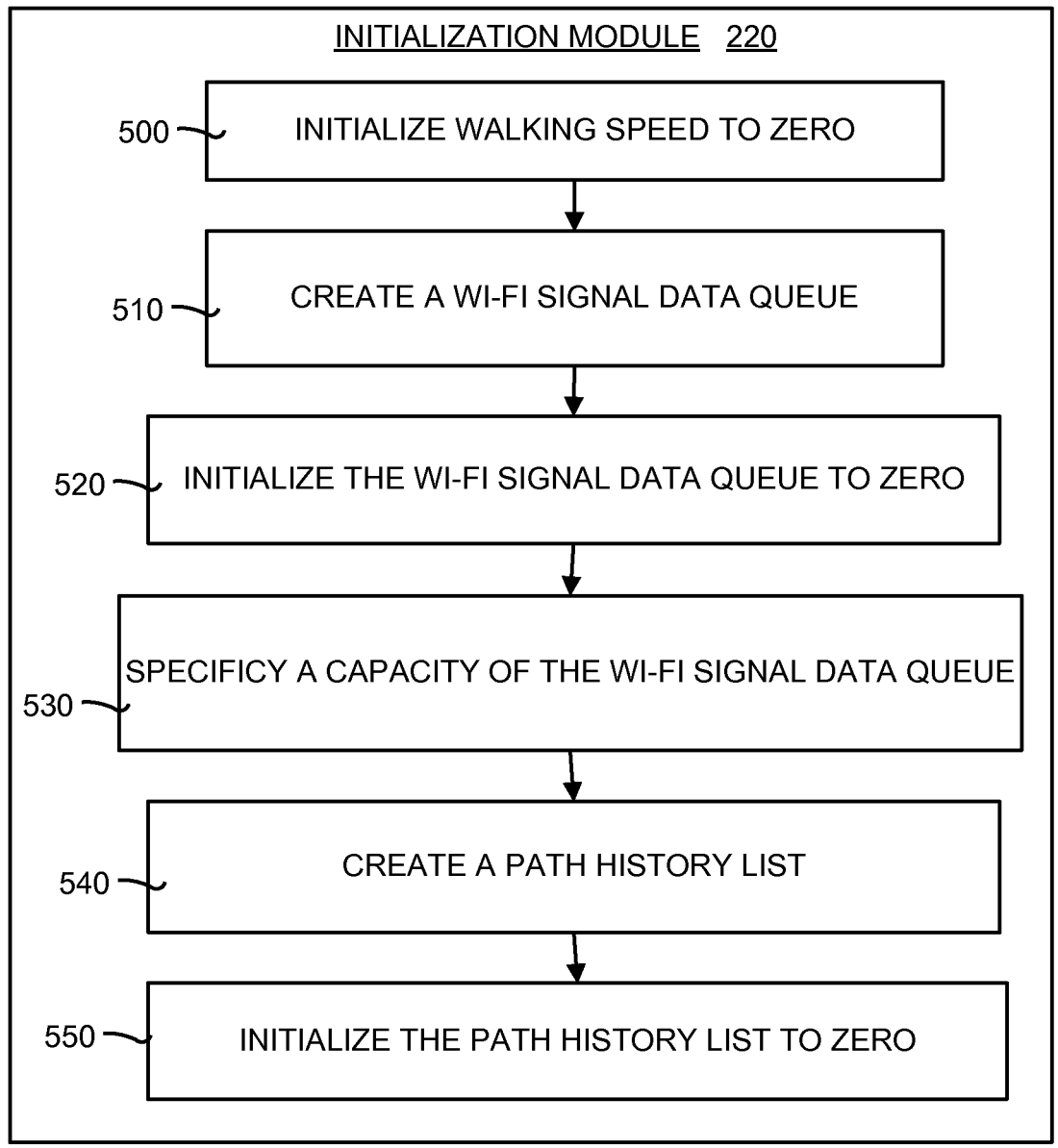
FIG. 5 is a flow diagram illustrating the operational details of embodiments of the initialization module shown in FIG. 2.

FIG. 5 is a flow diagram illustrating the operational details of embodiments of the initialization module 220 shown in FIG. 2. The operation begins by initializing a walking speed of a person holding the mobile device by setting the walking speed to zero (box 500). The walking speed is calculated and refined during the path positioning process. Once the walking speed is confirmed by observing little change after a certain period of time, then the walking speed can be used to guide the path positioning process.

Next, embodiments of the initialization module 220 create a Wi-Fi signal data queue (box 510). Initially, the Wi-Fi signal data queue is initialized to zero (box 520). The empty Wi-Fi signal data queue is specified with a specific capacity (box 530). By way of example, in some embodiments the capacity is equal to three. The larger the capacity of the Wi-Fi signal data queue, then a more powerful filtering effect is seen in filtering out abnormal signal readings. However, increasing the capacity also increase the severity of the time delay effect.

The Wi-Fi signal data includes a dictionary of value pairs including the Wi-Fi Source (or beacon's Media Access Control (MAC) address) where the signal originated and its Received Signal Strength Indicators (RSSI) reading. The use of the median values from the Wi-Fi signal data queue helps remove abnormal RSSI readings that occasionally occur. The exact time for each snapshot that the Wi-Fi signals are measured is also stored in the Wi-Fi signal data queue.

Next, embodiments of the initialization module 220 create a path history list (box 540) and initialize the path history list to zero (box 550). The path history list is a list of paths previously traversed by the mobile device. A "path" is defined by a FromNode, which is where the path originates from, and a ToNode, which is where a path terminates. Each path has three weights: (a) a "FromNode weight," a "ToNode weight," and a "Path Weight." The path with the maximum weight among all possible paths is designated as the "most probable path" and its "ToNode" is taken as the position to be determined.

As used here, the "weight" represents the likelihood of a mobile device user being at that node's location or following that specific path. A "Position Tracker" is a module that is used to keep track of a mobile user's position history. It includes the following information: (a) a Wi-Fi signal data queue that includes the most recently added Wi-Fi signals data series with time stamp; and, (b) a path collection list that stores all the previous possible paths. Each mobile device being tracked has its own Position Tracker responsible for its positioning task.

III.D. Path Progression Module

Embodiments of the path progression module 230 determine the current location of the mobile device and the path taken to get to that current location. Embodiments of the path progression module 230 include the first-stage progression module 250, the second-stage progression module 260, the third-stage progression module 270, and the maximum path weight module 280. Each of these modules will now be discussed in detail.

III.D.i. First-Stage Progression Module

Embodiments of the first-stage progression module 250 are used to find a starting location for the path progression matching technique used by embodiments of the path progression matching system 100.

Figure 6:
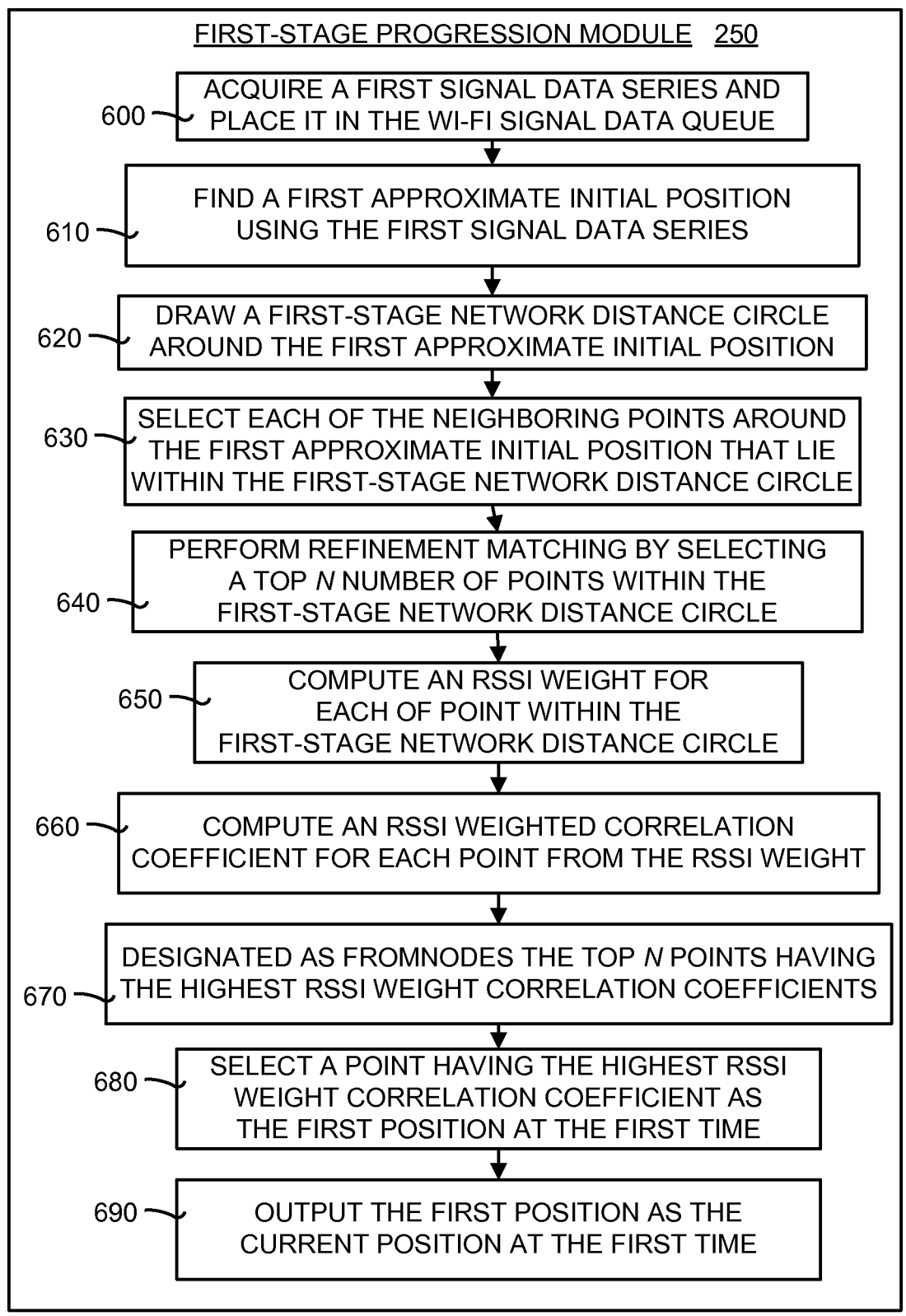
FIG. 6 is a flow diagram illustrating the operational details of embodiments of the first-stage progression module shown in FIG. 2.

FIG. 6 is a flow diagram illustrating the operational details of embodiments of the first-stage progression module 250 shown in FIG. 2. The operation begins by acquiring a first signal data series and placing it in the Wi-Fi signal data queue (box 600). It should be noted that when the first signal data series is added to the Wi-Fi signal queue there no path that yet exists.

Next, the first signal data series is used to find an approximate initial position (box 610). This represents the first position at a first time. In some embodiments a pattern matching technique is applied to survey points in order to find the approximate initial position. As noted above, a survey point is a known indoor location where Wi-Fi signals are measured and the location where the RSS values are recorded and associated. The pattern matching technique conducts a coarse matching but still ensures robustness. This robustness means that the error term is less than a certain distance. In some embodiments, the error term is less than 20 meters. Then a first-stage circle is drawn around the first position, where the first-stage circle has a radius equal to a network distance and is called a first-stage network distance circle (box 620). Each of the neighboring points around the first position that lie within the first-stage network distance circle then are selected (box 630).

Embodiments of the first-stage progression module 250 then perform refinement matching. Refinement matching includes selecting the top N points within the first-stage network distance circle (box 640). In some embodiments the value of N equals ten, such that the top N=10 points are selected. Calculating the top N points may be done using a plurality of different techniques. In some embodiments, the top N points are found by finding the RSSI weighted coefficient for each point. This involves first computing an RSSI weight for each point in the first-stage network distance circle (box 650). The RSSI weight, $W_i$, is given by the equation, $$W_i = e^{\frac{(S_i + 100)}{100}},$$

where $S_i$ is the Wi-Fi RSSI reading in decibels (dB). From the RSSI weight an RSSI Weighted Correlation Coefficient is computed for each point (box 660). The RSSI Weighted Correlation Coefficient, $W_{RSS}$, is given by the equation, $$\frac{\sum_{i=1}^{n} w_i x_i y_i - \sum_{i=1}^{n} w_i x_i \sum_{i=1}^{n} w_i y_i / \sum_{i=1}^{n} w_i}{\sqrt{\left(\sum_{i=1}^{n} w_i x_i^2 - \left(\sum_{i=1}^{n} w_i x_i\right)^2 / \sum_{i=1}^{n} w_i\right)\left(\sum_{i=1}^{n} w_i y_i^2 - \left(\sum_{i=1}^{n} w_i y_i\right)^2 / \sum_{i=1}^{n} w_i\right)}},$$

where $W_i$ is the RSSI weight, $X_i$ is the input signal RSS value of the $i^{th}$ Wi-Fi access point, $y_i$ is the RSS value of the $i^{th}$ Wi-Fi access point at a known location, and n is the number of Wi-Fi access points that are used to compute the correlation coefficient.

The points with the top N highest RSSI Weight Correlation Coefficients are selected as the From Nodes for potential paths (box 670). The point from the selected top N points within the circular buffer points having the highest correlation coefficient then is selected as the current location (box 680). In addition, this current location is the From Node and the current output location for embodiments of the path progression matching system 100. In particular, the first position is output as the current position at the first time (box 690). Note that at this moment only the RSSI Weighted Correlation Weight, $W_{RSS}$, is used. All other weights are set to a value of one. It should be noted that a larger weight is assigned to the stronger Wi-Fi signal readings.

III.D.ii. Second-Stage Progression Module

Figure 7:
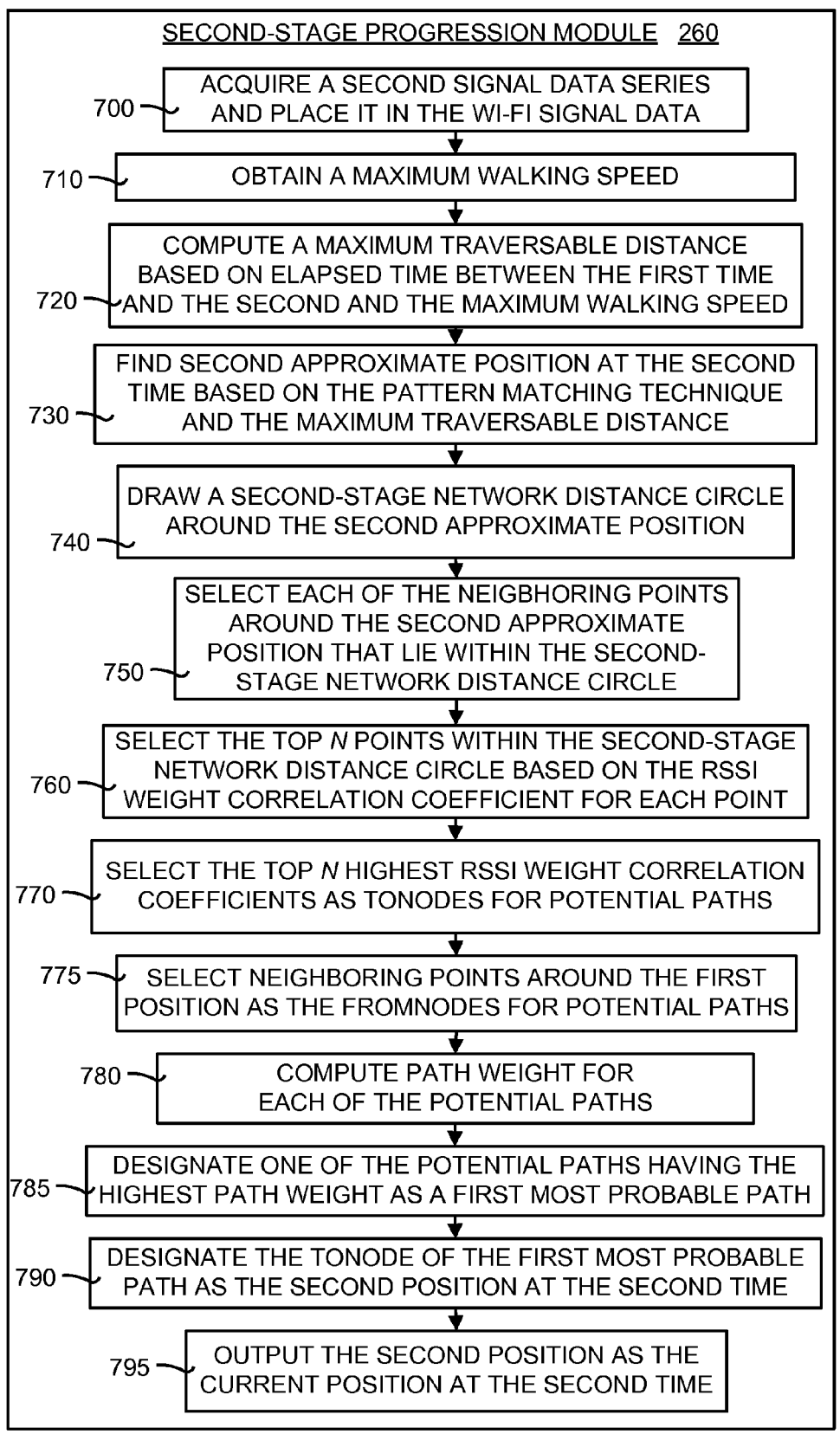
FIG. 7 is a flow diagram illustrating the operational details of embodiments of the second-stage progression module shown in FIG. 2.

Embodiments of the second-stage progression module 260 are used to begin a path matching technique for embodiments of the path progression matching system 100. FIG. 7 is a flow diagram illustrating the operational details of embodiments of the second-stage progression module 260 shown in FIG. 2. The operation begins by acquiring a second signal data series and placing it in the Wi-Fi signal data queue (box 700). Once the second signal data series is added to the Wi-Fi signal data queue then paths can be built.

Embodiments of the second-stage progression module 260 then obtain a maximum walking speed (box 710). Next, a maximum traversable distance is computed based on the elapsed time between a first-stage time (the time at which the first signal data series was acquired) and a second-stage time (the time at which the second signal data series was acquired), and the maximum walking speed (box 720).

The pattern matching technique and the maximum traversable distance are used to find a second approximate position of the mobile device at a second time (box 730). Then a second-stage network distance circle is drawn around the second approximate position at the second time, where the circle has a radius equal to a network distance at the second time and is called a second-stage network distance circle (box 740). Each of the neighboring points around the second approximate position at the second time that lie within the second-stage network distance circle then are selected (box 750).

Embodiments of the second-stage progression module 260 then select the top N points within the second-stage network distance circle (box 760). As noted above, calculating the top N points may be done using a plurality of different techniques, including using the RRSI weighted coefficient for each point. The points in the second-stage network distance circle having the top N highest RSSI Weight Correlation Coefficients are selected as the ToNodes for potential paths (box 770). The neighboring points around the first position (which was computed by the first-stage progression module 250) are selected as the FromNodes of all possible paths (box 775). The total number of possible paths is M*N, where M is the number of FromNodes and N is the number of ToNodes.

The weight of a path is computed as the product of a FromNode Weight and a ToNode Weight. As noted above, a limit is place on the number of FromNodes and the number of ToNodes. By way of example, in the embodiments where M=10 and N=10, then the maximum number of paths is 100 (10×10). The Path Weight for each of the paths then is computed (box 780). The path having the highest Path Weight is selected as a first most probable path (box 785). The ToNode of the first most probable path is selected as the current location (or second position) at the second time (box 790). In addition, this second position at the second time is the current output location for embodiments of the path progression matching system 100 at the second time (box 795).

III.D.iii. Third-Stage Progression Module

Figure 8:
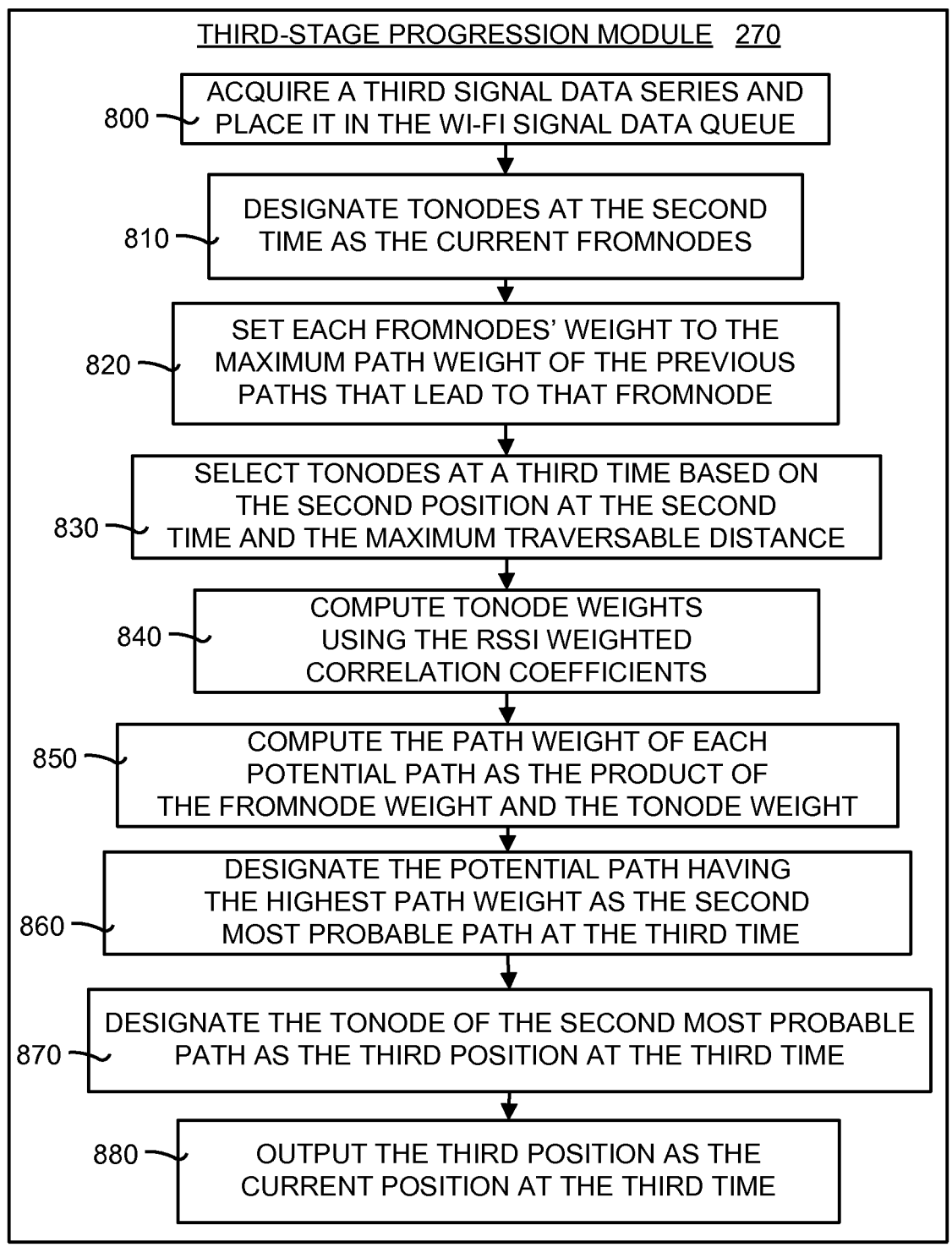
FIG. 8 is a flow diagram illustrating the operational details of embodiments of the third-stage progression module shown in FIG. 2.

Embodiments of the third-stage progression module 270 are used to continue the path matching technique for embodiments of the path progression matching system 100. FIG. 8 is a flow diagram illustrating the operational details of embodiments of the third-stage progression module 270 shown in FIG. 2. The operation begins by acquiring a third signal data series and placing it in the Wi-Fi signal data queue (box 800). The ToNodes at the second time are designated as the current FromNodes (box 810). Each FromNodes' weight is set to the maximum path weight of the previous paths that lead to that FromNode (box 820).

To Nodes at a third time are selected based on the current location at the second time and the maximum traversable distance (box 830). Next, the ToNodes weights are computed using the RSSI Weighted Correlation Coefficients, as described above (box 840). The Path Weight of each path's weight is computed as the multiplication of the FromNode Weight and the ToNode Weight of that path (box 850). The path having the highest Path Weight is selected as the second most probable path at the third time (box 860). The ToNode of the second most probable path is selected as a third position (and the current location) at the third time (box 870). In addition, this third position at the third time is the current output location for embodiments of the path progression matching system 100 at the third time (box 880). It should be noted that subsequent stages (or progressions) follow a similar process as shown in FIG. 8.

III.D.iv. Maximum Path Weight Module

Embodiments of the path progression module 230 include a maximum path weight module 280 that prevents the Path Weight from getting too small. Because the Path Weight is obtained by node weight multiplication and previous paths' weight become the current paths' FromNode weight, the current paths' weight will become smaller and smaller as the progression advances. Embodiments of the maximum path weight module 280 are used to avoid its being too small to be insignificant as represented in a computer.

Figure 9:
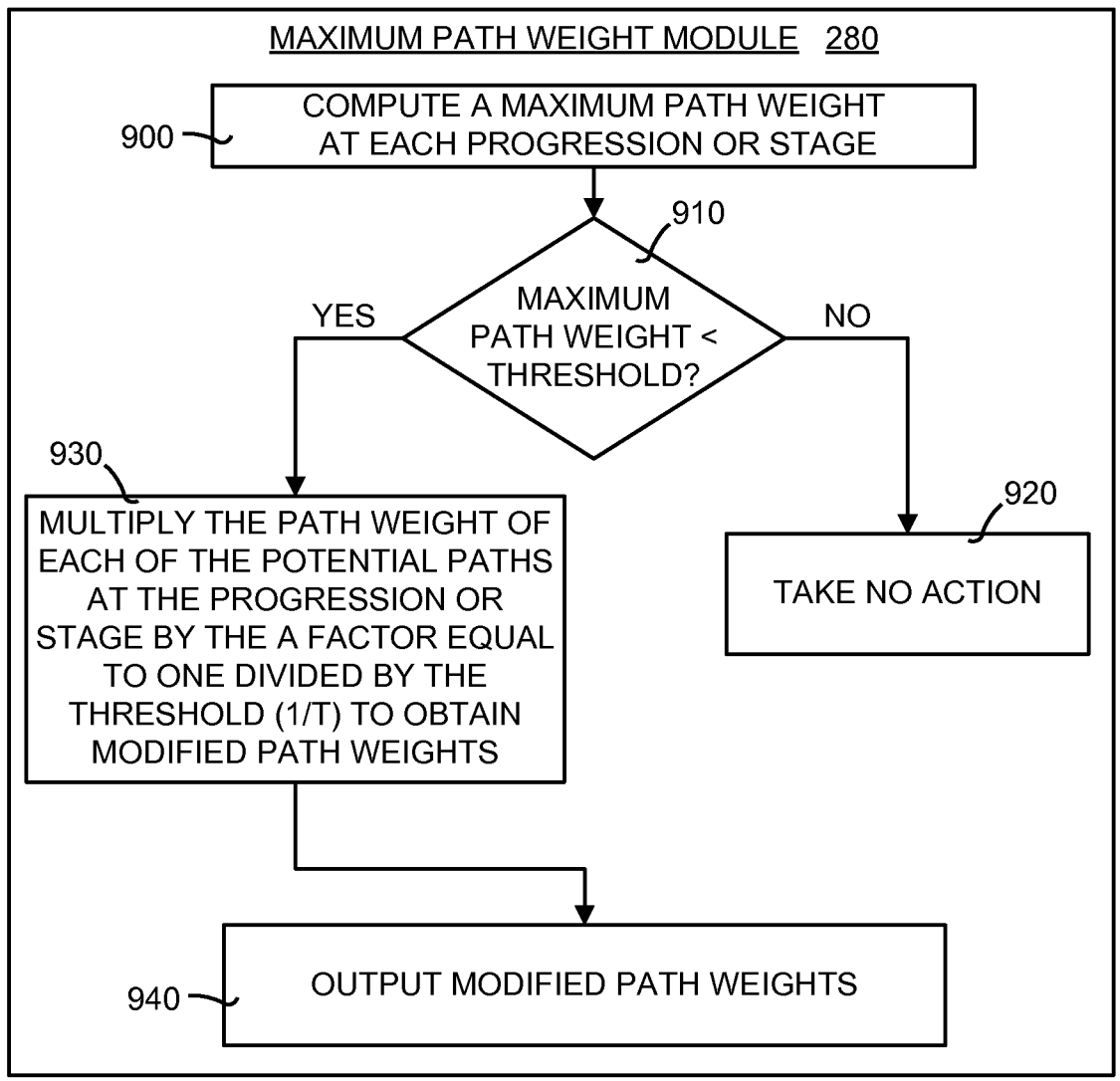
FIG. 9 is a flow diagram illustrating the operational details of embodiments of the maximum path weight module shown in FIG. 2.

FIG. 9 is a flow diagram illustrating the operational details of embodiments of the maximum path weight module 280 shown in FIG. 2. The operation begins by computing a Maximum Path Weight at each progression (or stage) (box 900). A determination then is made as to whether the Maximum Path Weight is less than a threshold, T (box 910). In some embodiments the threshold, T, is equal to 0.3. If the Maximum Path Weight is greater than or equal to the threshold, then no action is taken (box 920). However, if the Maximum Path Weight is less than the threshold, then the Path Weight of each of the paths are multiplied by a factor set to 1/T to obtain modified path weights (box 930). This means that the Maximum Path Weight will be normalized to equal 1.0. As each path's Path Weight is multiplied by the same number, the ranking of all the paths are not affected. The modified path weights then are output (box 940).

IV. Exemplary Operating Environment

Embodiments of the path progression matching system 100 and method are designed to operate in a computing environment. The following discussion is intended to provide a brief, general description of a suitable computing environment in which embodiments of the path progression matching system 100 and method may be implemented.

Figure 10:
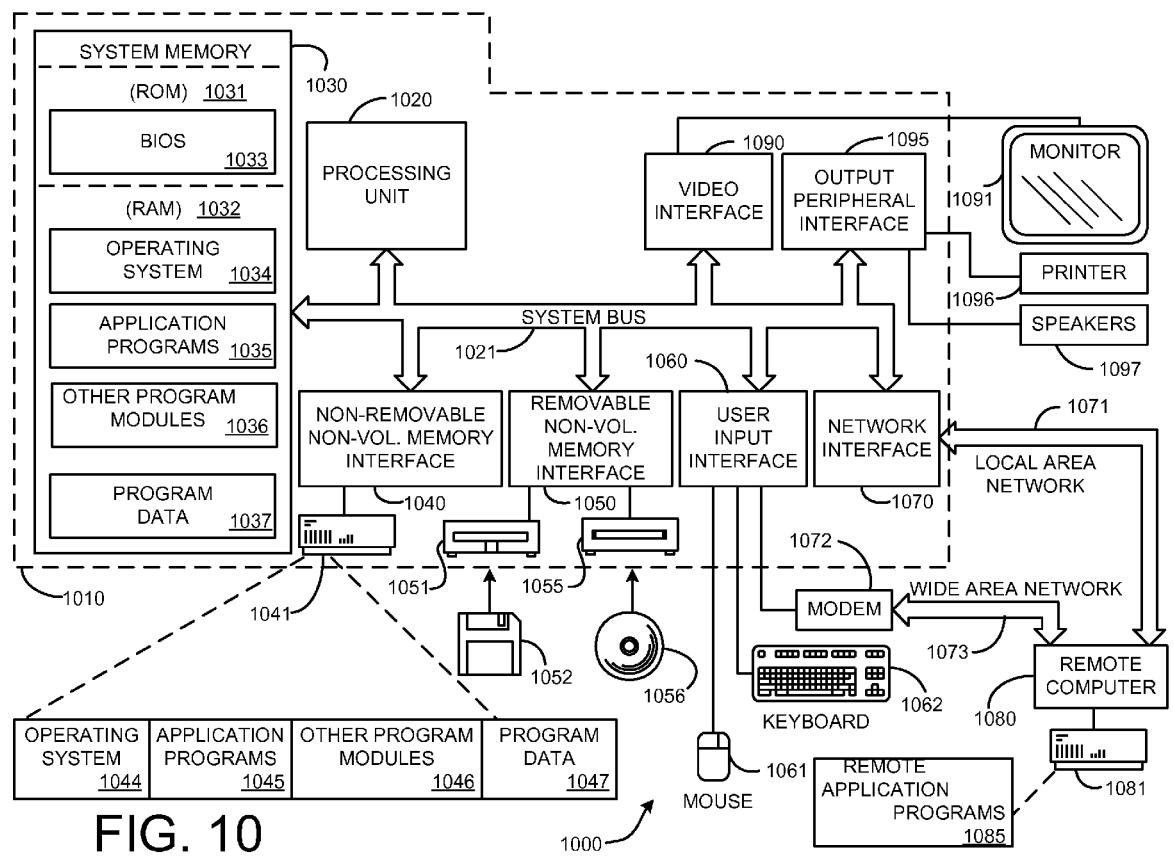
FIG. 10 illustrates an example of a suitable computing system environment in which embodiments of the path progression matching system and method shown in FIGS. 1-9 may be implemented.

FIG. 10 illustrates an example of a suitable computing system environment in which embodiments of the path progression matching system 100 and method shown in FIGS.

1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment.

Embodiments of the path progression matching system 100 and method are operational with numerous other general purpose or special purpose computing system environments or configurations. Examples of well known computing systems, environments, and/or configurations that may be suitable for use with embodiments of the path progression matching system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the path progression matching system 100 and method may be described in the general context of computer-executable instructions, such as program modules, being executed by a computer. Generally, program modules include routines, programs, objects, components, data structures, etc., that perform particular tasks or implement particular abstract data types. Embodiments of the path progression matching system 100 and method may also be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor.

With reference to FIG. 10, an exemplary system for embodiments of the path progression matching system 100 and method includes a general-purpose computing device in the form of a computer 1010. Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically includes data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information (or data) into the computer 1010 through input devices such as a keyboard 1062, pointing device 1061, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method, implemented on a computer processing unit, of finding a position and a path of a mobile device, the method comprising:
    obtaining a first set of received signal strength (RSS) data at a first time;
    finding a first position of the mobile device using the first set of RSS data;
    obtaining a second set of RSS data at a second time that is later than the first time;
    finding a second position of the mobile device at the second time using the second set of RSS data;
    calculating a first most probable path between the first position and the second position;
    adding the first most probable path to a path history list;
    using the path history list to find a current position of the mobile device at another time and another most probable path taken to get to the current position; and
    scoring a probability that the mobile device is in the current position using the first most probable path.

2. The method of claim 1, further comprising outputting the first position to an application for tracking of the mobile device in an indoor environment.

3. The method of claim 1, further comprising:
    obtaining a third set of RSS data at a third time that is later than the second time;
    finding a third position of the mobile device at the third time using the third set of RSS data; and
    calculating a second most probable path between the second position and the third position using paths stored in the path history list.

4. The method of claim 3, further comprising adding the second most probable path to the path history list.

5. The method of claim 1, further comprising:
    finding a first approximate initial position using the first set of RSS data;
    computing a first-stage network distance;
    determining a first-stage network distance circle around the first approximate initial position, where the first-stage network distance circle has a radius of the first-stage network distance; and
    selecting neighboring points around the first approximate initial position that lie within the first-stage network distance circle.

6. The method of claim 5, further comprising:
    selecting a top N number of the neighboring points within the first-stage network distance circle;
    computing a received signal strength indicator (RSSI) weight for each of the top N number of the neighboring points; and
    computing an RSSI weighted correlation coefficient for each of the top N number of the neighboring points from the RSSI weight.

7. The method of claim 6, further comprising designating as FromNodes the top N number of points having an N number of highest RSSI weight correlation coefficients.

8. The method of claim 7, further comprising selecting as the first position at the first time a point from the top N number of points having a highest RSSI weight correlation coefficient.

9. The method of claim 1, further comprising:
    obtaining a maximum walking speed;
    computing a maximum traversable distance based on an elapsed time between the first time and the second time and the maximum walking speed;
    finding a second approximate position at the second time based on the maximum traversable distance;
    computing a second-stage network distance; and
    determining a second-stage network distance circle around the second approximate position, where the second-stage network distance circle has a radius of the second-stage network distance.

10. The method of claim 9, further comprising:
    selecting a top N number of points within the second-stage network distance circle based on a received signal strength indicator (RSSI) weight correlation coefficient for each of the top N number of points;
    selecting points from the top N number of points as ToNodes for potential paths from the first position to the second position; and
    selecting neighboring points around the first position as FromNodes for the potential paths.

11. The method of claim 10, further comprising:
computing a path weight for each of the potential paths; and
designating one of the potential paths having a highest path weight as the first most probable path.

12. The method of claim 11 further comprising designating a ToNode of the first most probable path as the second position at the second time.

13. The method of claim 10, further comprising:
designating the ToNodes of the potential paths from the first position to the second position as current FromNodes;
setting a weight of each of the current FromNodes to a maximum path weight of a sum of paths that led to the current FromNodes; and
selecting ToNodes at a third time that is later than the second time based on the second position at the second time and the maximum traversable distance.

14. The method of claim 13, further comprising:
computing ToNode weights using corresponding RSSI weighted correlation coefficients;
computing a path weight of potential paths at the third time as a product of the FromNode weight and the ToNode weight;
designating one of the potential paths at the third time having a highest path weight as a second most probable path at the third time; and
designating a ToNode of the second most probable path as a third position at the third time.

15. A system comprising:
a processing unit; and
one or more computer storage media storing computer readable instructions that, when executed by the processing unit, configure the processing unit to:
find a first potential location of a mobile device;
build a path history that includes a first path taken from the first potential location of the mobile device to a second potential location of the mobile device;
use the path history to find a potential current location of the mobile device and a second path taken to reach the potential current location; and
score a probability that the mobile device is at the potential current location using the first path and the second path.

16. The system of claim 15, wherein the computer readable instructions further configure the processing unit to:
apply constraints to find the potential current location, the constraints including:
a network distance constraint that uses a person's walking speed to indicate a distance that a person is likely to walk in a given time; and
a physical constraint that indicates which areas of an indoor environment are inaccessible.

17. The system of claim 15, embodied as a device other than the mobile device.

18. A volatile or nonvolatile computer storage media storing computer readable instructions that, when executed by a processor, cause the processor to perform acts for determining a position and a path of a mobile device in an indoor environment, the acts comprising:
receiving a plurality of received signal strength (RSS) data at different times, the RSS data representing strength of signals received by the mobile device;
using a first set of RSS data from the plurality of RSS data to find a first approximate initial position of the mobile device;
computing a first-stage network distance circle having a radius equal to a first-stage network distance and a center at the first approximate initial position;
computing a received signal strength indicator (RSSI) weight for points within the first-stage network distance circle;
computing an RSSI weighted correlation coefficient for each of the points using the RSSI weights;
selecting one of the points having a highest RSSI weighted correlation coefficient as a first position at the first time;
using a second set of RSS data from the plurality of RSS data to find a second position of the mobile device at a second time;
designating the points within the first-stage network distance circle as FromNodes and the second position as a ToNode;
computing potential paths from the FromNodes to the ToNode;
calculating one of the potential paths as a first most probable path between the first position and the second position; and
adding the first most probable path to a path history list.

19. The volatile or nonvolatile computer storage media of claim 18, the acts further comprising:
using a third set of RSS data from the plurality of RSS data to find a third position of the mobile device at a third time;
designating ToNodes at the second time as current FromNodes at the third time;
computing weights for the current FromNodes as a maximum path weight of a sum of paths leading to the current FromNodes;
selecting ToNodes at the third time based on the second position;
computing weights for the ToNodes at the third time using RSSI weighted correlation coefficients;
finding potential paths from the FromNodes to the ToNodes;
computing a path weight for each of the potential paths as a product of the FromNode weight and the ToNode weight; and
designating one of the potential paths having a highest path weight as a second most probable path at the third time.

20. The volatile or nonvolatile computer storage media of claim 19, the acts further comprising:
computing a maximum path weight at each stage of path progression;
determining that the maximum path weight for a stage is less than a threshold;
multiplying path weights of each of the potential paths for the individual stage by a factor equal to one divided by the threshold to obtain modified path weights; and
using the modified path weights in the path progression.

* * * * *